2,807,622
Patented Sept. 24, 1957

2,807,622

ANTHRAQUINONE VAT DYESTUFFS

Theodor Holbro, Basel, and Walter Kern, Sissach, Switzerland, assignors to Ciba Limited, Basel, Switzerland, a Swiss firm No Drawing. Application January 3, 1956,
Serial No. 556,793

Claims priority, application Switzerland January 28, 1954

5 Claims. (Cl. 260—307.5)

This application is a continuation-in-part of my copending application Serial No. 484,056, filed January 25, 1955 (now U. S. Patent No. 2,792,384). The present invention provides new anthraquinone vat dyestuffs which correspond to the formula

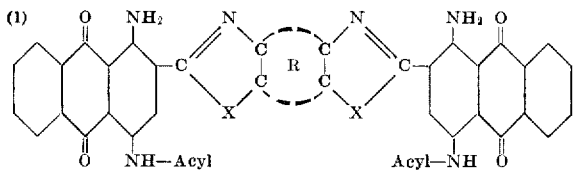

in which each X is a bivalent radical completing the five-membered hetero ring shown in the formula, R indicates an aromatic radical having at most 12 nuclear carbon atoms, and Acyl stands for the radical of a monocraboxylic acid. As bivalent radicals completing the five-membered hetero rings shown in Formula 1 there come into consideration for example an —O—, —S—, —NH—,

or

radical.

Of special interest are those dyestuffs of Formula 1 wherein X is an oxygen atom or an

radical. The acyl groups are derived from a mono carboxylic acid, such as benzoic acid and its substitution products, naphthalene carboxylic acids or anthraquinone carboxylic acids, such as the acyl radical derived from the following acids:

2-, 3- or 4-methylbenzene-1-carboxylic acid,
2-, 3- or 4-chlorobenzene-1-carboxylic acid,
2-, 3- or 4-fluorobenzene-1-carboxylic acid,
3- or 4-trifluoromethylbenzene-1-carboxylic acid,
2-, 3- or 4-bromobenzene-1-carboxylic acid,
2:4- or 2:5-dichlorobenzene-1-carboxylic acid,
3:5-dibromobenzene-1-carboxylic acid,
4-cyanobenzene-1-carboxylic acid,
3- or 4-methoxybenzene-1-carboxylic acid,
Benzene-1-carboxylic acid-3- or -4-methyl sulfone,
Benzene-1-carboxylic acid-3- or -4-isopropyl sulfone,
Benzene-1-carboxylic acid-4-sulfonic acid dimethylamide,
Benzene-1-carboxylic acid-4-sulfonic acid morpholide,
Cinnamic acid,
1:1′-diphenyl-4-carboxylic acid,
4′-chloro-1:1′-diphenyl-4-carboxylic acid
Pyridine-3-carboxylic acid,
Naphthalene-2-carboxylic acid,
Anthraquinone-2-carboxylic acid,
1-nitroanthraquinone-2-carboxylic acid,
1-aminoanthraquinone-2-carboxylic acid,
1-nitroanthraquinone-3-carboxylic acid,
Anthraquinone - (N)1:2 - benzene - (N)2′:1′-acridone-5′-carboxylic acid.

As is clear from the above description, the hetero rings of the Formula 1 can be oxazole, imidazole, N-alkyl-imidazole, N-aryl-imidazole or thiazole rings. The ring systems R can contain the customary substituents present in vat dyestuffs, for example halogen atoms such as fluorine, chlorine or bromine, low molecular alkyl or alkoxy groups, such as methyl, ethyl, methoxy or ethoxy groups, alkyl or phenyl sulfone groups or sulfonic acid dialkylamide groups.

The dyestuffs of the Formula 1 can be of symmetrical or asymmetrical constitution. Thus, for example, they can contain two different hetero rings and/or two different NHXacyl groups.

The new dyestuffs of the constitution set forth above are obtained by condensing 2 mols of an anthraquinone which contains in 1-position an —NH₂ group or a substituent convertible thereinto, in 4-position no substituent, an acylamino group or a substituent convertible thereinto and in 2-position a substituent containing a CO group and capable of reaction with amino groups, preferably a carboxylic acid halide group, with one mol of a primary aromatic diamine of the benzene, naphthalene or diphenyl series which contains in the adjacent position to each amino group a substituent which together with this amino group, the carbon atoms between it and the amino group and the substituent present in 2-position of the anthraquinone nucleus is capable of forming a 5-membered hetero ring. In the so-obtained condensation products of the formula

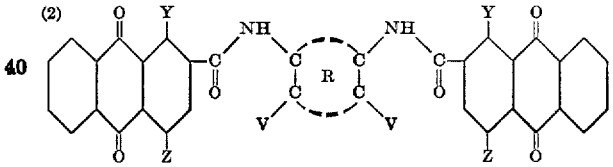

in which R has the above-defined meaning, V is a substituent capable of undergoing hetero ring formation, Y is an NH₂-group or a group convertible thereinto, and Z is an acylamino group or a group convertible thereinto, Y is converted into an NH₂-group, unless an NH₂-group is already present, Z is converted into an acylamino group unless an acylamino group is already present, and the two hetero rings are formed. The ring closure can also be effected before the conversion of Z into an acylamino group.

The intermediate compounds of the Formula 2 containing two anthraquinone nuclei are obtained, for example, by condensation of 2 mols of 1-amino-4-nitro-anthraquinone-2-carboxylic acid halide with 1 mol of a compound which contains one of the atom groupings above described, which are capable of forming hetero rings, twice in the molecule, followed by double ring closure. As examples of such compounds there may be mentioned: 1:4-diamino-2:5-dihalogen benzenes, 1:3-di-amino-4:6-dihalogen benzenes, 3:3′-dichloro- or 3:3′-dihydroxy-4:4′-diaminodiphenyl and 1:5-diamino-4:8-dioxynaphthalenes.

Other modifications of the general methods of production set forth above may often be of value. Thus for example, the acylamino group present in 4-position of the anthraquinone nucleus of the final materials, can have been introduced also by reaction of a halogen atom previously present in this position, for example a chlorine or bromine atom, with a carboxylic acid amide or an arylsulfonic acid amide, in the latter case the —NH—O₂S-aryl group introduced into the 4-position of the anthraquinone nucleus being advantageously hydrolysed to the NH₂-group and this then further acylated by means of a carboxylic acid halide.

When anthraquinone compounds are used as starting materials which at the commencement contain no substituents in 4-position, as for example 1-aminoanthraquinone-2-carboxylic acid halides, first the condensation on the carboxylic acid halide group followed by ring closure may take place and then in the conventional manner the intermediate products obtained nitrated or halogenated in 4-position of the anthraquinone nuclei, the nitro groups or halogen atoms converted into amino groups and the products acylated in the manner described.

In the synthesis of the new dyestuffs, instead of condensing an anthraquinone substituted in 2-position by a carboxylic acid halide group, with an amine of the specified type and then effecting ring closure, it is also possible in some cases to react an anthraquinone substituted in 2-position by an aldehyde group, for example a 1-amino-4-halogenanthraquinone-2-aldehyde, with a p-diaminobenzoquinone, such as 2:5-diamino-3:6-dichlorobenzoquinone-(1:4), with the direct formation of the oxazole compound. In this case a simultaneous conversion takes place of the quinone ring into a benzene ring, and the resulting product can be condensed in this benzene radical, which still contains a primary amino group and a hydroxyl group in o-position thereto, with an anthraquinone-2-carboxylic acid halide, which contains in 1- and 4-position the substituents required in starting materials for the present process, whereupon an oxazole ring closure can be effected. This modification of the process is also suitable for the manufacture of both symmetrical and more especially asymmetrical dyestuffs.

The reactions required in the process of this invention can be carried out in any conventional manner.

The vat dyestuffs obtained possess the constitution hereinbefore set forth and can be used in the known manner as such or in the form of the leuco ester salts obtainable by conventional methods, for the dyeing and printing of a variety of fibers of animal but more especially of vegetable origin, i. e. for wool or silk but preferably for cotton, linen, artificial silk and staple fiber from regenerated cellulose and also for polyamide fibers. The dyeings and printings are distinguished by great strength and very good fastness properties. There are obtained among others grey shades or shades of which the color is displaced towards blue, and which together with the customary fastness to wet processes and together with good fastness to light possess a good fastness to drops of water and good color in artificial light.

The following examples illustrate the invention, the parts being by weight unless otherwise stated and the relationship between part by weight and part by volume being the same as that of the kilogram to the liter.

*Example 1*

2 parts of the dyestuff of the formula (3)
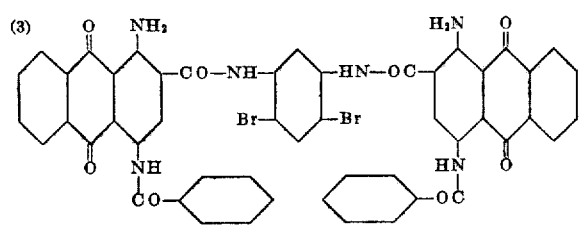

are stirred for 15 hours at 200–205° C. with 1 part of potassium acetate, 0.05 part of cupric oxide and 0.02 part of cuprous chloride in 85 parts of nitrobenzene. The dyestuff isolated by filtration after cooling dyes cotton from a violet vat in strong blue grey shades. Analysis indicates the following constitution (4)
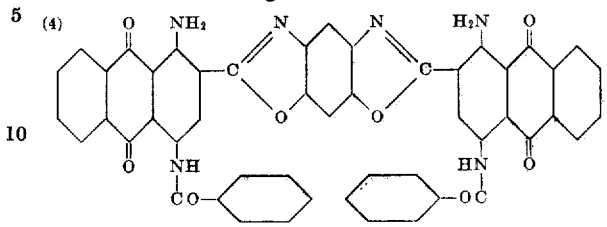

The starting material can be obtained by condensation of 2 mols of 1-amino-4-nitroanthraquinone-2-carboxylic acid chloride with 1 mol of 1:3-diamino-4:6-dibromobenzene, reduction of the nitro groups and benzoylation of the amino groups produced.

*Example 2*

20 parts of the dyestuff of the formula (5)
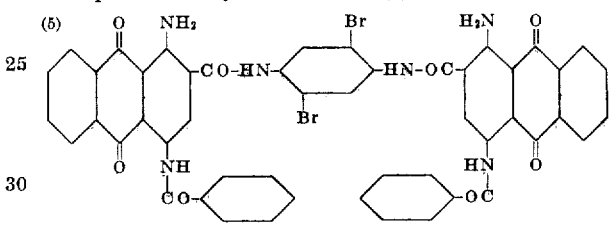

are heated to boiling for 15 hours with 20 parts of anhydrous sodium acetate, 1 part of cuprous chloride and 400 parts of aniline. The reaction product which is filtered after cooling is washed with aniline and alcohol and treated with hot dilute hydrochloric acid. It constitutes a dyestuff which according to analysis has the following formula (6)
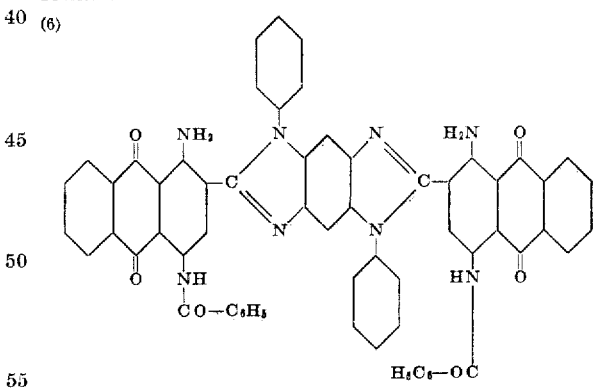

It dissolves in concentrated sulfuric acid with an olive color and dyes cotton from a violet vat in strong blue grey shades.

The starting material can be obtained by condensation of 2 mols of 1-amino-4-nitroanthraquinone-2-carboxylic acid chloride with 1 mol of 1:4-diamino-2:5-dibromobenzene, reduction of the nitro groups and benzoylation of the amino groups thereby produced.

*Example 3*

To a suspension of 70.8 parts of the compound of the formula (7)
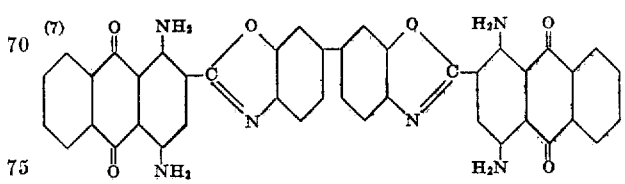

in 3000 parts of dry nitrobenzene are added 34 parts of benzoyl chloride and 20 parts of dry pyridine. The mixture is stirred for 4 hours at 130° C. and 2 hours at 140–150° C. and after cooling filtered. The resulting dyestuff of the formula

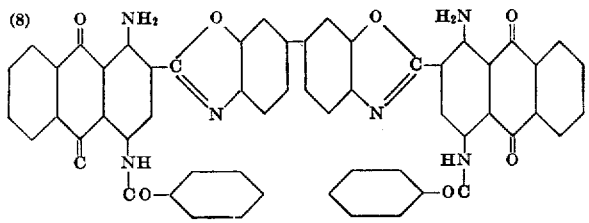

dissolves in concentrated sulfuric acid with a yellow brown color and dyes cotton from a violet vat in blue grey shades.

The starting material of the Formula 7 is obtained as follows:

To a suspension of 140 parts of 1-amino-4-nitroanthraquinone-2-carboxylic acid chloride and 57.8 parts of 3:3'-dihydroxybenzidine hydrochloride in 2100 parts of o-dichlorobenzene are added dropwise at 140–150° C. within one hour 100 parts of pyridine mixed with 420 parts of o-dichlorobenzene and the mixture is further stirred for 3 hours at the same temperature. The condensation product which is filtered off after cooling, after washing and drying forms a violet powder which dissolves in concentrated sulfuric acid with a brownish yellow color.

80.4 parts of this condensation product are stirred with 2100 parts of o-dichlorobenzene and 110 parts of phenyl hydrazine for 7 hours while distilling off the water formed at 150–160° C. The reduction product isolated after cooling by filtration forms a blue powder which is soluble in concentrated sulfuric acid with a brownish yellow color.

50 parts of the reduction product and 2.5 parts of crystallized p-toluene sulfonic acid are maintained at the boiling point in 1200 parts of nitrobenzene for 5 hours while distilling off the water formed. The reaction product filtered off from the cooled suspension is washed with nitrobenzene and alcohol. It forms a dark powder which dissolves in concentrated sulfuric acid with a yellow brown color.

*Example 4*

35 parts of the compound of the formula

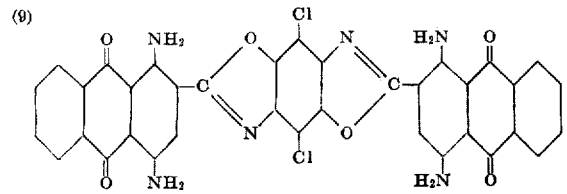

in 1000 parts of nitrobenzene are treated with 17 parts of benzoyl chloride and 10 parts of pyridine and the whole stirred for 3 hours at 160–170° C. The dyestuff of the formula

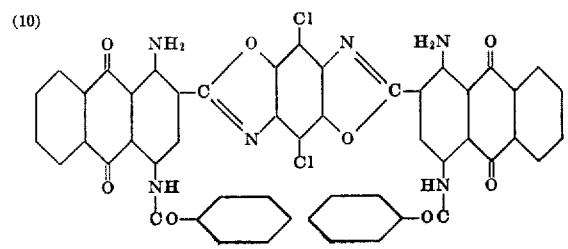

which is filtered off at 70° C., dissolves in concentrated sulfuric acid with an olive brown color and dyes cotton from a blue-violet vat in strong blue grey shades.

The starting material of the Formula 9 can be prepared as follows:

33.0 parts of 1-amino-4-bromanthraquinone-2-aldehyde and 25 parts of 2:5-diamino-3:6-dichlorobenzoquinone are introduced with stirring into 165 parts of 96% sulfuric acid and the whole stirred for 6 hours at 90–100° C. After cooling, the sulfuric acid solution is poured into ice water and the separated precipitate, after filtration and washing, stirred into a sodium acetate solution containing some acetic acid. After 2 hours' stirring, the condensation product of the formula

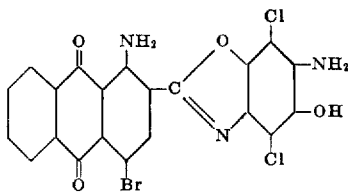

is filtered, washed and dried.

The color of the solution in sulfuric acid is yellow brown and the product vats easily with a red brown color.

20.8 parts of the resulting intermediate product are stirred for 20 hours at 90–100° C. with 15.3 parts of 1-amino-4-bromanthraquinone-2-carboxylic acid chloride in 430 parts of dry nitrobenzene. The cooled mixture is filtered and washed with nitrobenzene and alcohol. The resulting product dissolves in sulfuric acid with a yellow brown color.

20 parts of the resulting product are introduced with stirring into 400 parts of 96 percent sulfuric acid, the whole heated to 90° C. within ½ hour and maintained for one hour at 90–100° C. By addition of water to bring the sulfuric acid concentration to 85%, the sulfate of the substance formed is caused to separate. After cooling, the mixture is filtered and the residue washed with 80% sulfuric acid and worked up in the customary manner. The product of the formula

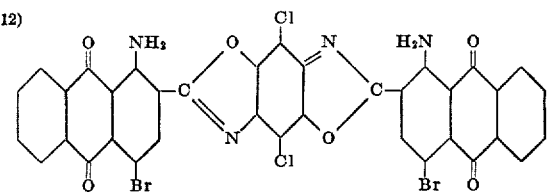

dissolves in sulfuric acid with a brownish yellow color and dyes cotton from a dark blue vat in red shades.

40 parts of p-toluene sulfonamide and 23 parts of potassium carbonate are stirred in 1700 parts of nitrobenzene for one hour at 170–180° C. Thereupon 83 parts of the product of the Formula 12 and 1.5 parts of cuprous chloride are introduced and the mixture is stirred for 15 hours at 180–185° C. The resulting intermediate product is stirred with 15 times the quantity of sulfuric acid for two hours at 35–40° C. The concentration of the sulfuric acid is then brought to 77% by addition of water and the separated sulfate filtered after some hours, washed with 75% sulfuric acid and worked up in the customary manner. The resulting product of the Formula 9 is a dark blue powder which dissolves in sulfuric acid with a yellow brown color.

A dyestuff which very probably is identical with the product described in paragraph 1 of the above example can also be obtained in the following manner: Equal parts of 1-aminoanthraquinone-2-aldehyde and 2:5-diamino-3:6-dichloroquinone are stirred at 90° C. for several hours in concentrated sulfuric acid, the solution then poured onto ice and the resulting intermediate product stirred with 1-aminoanthraquinone-2-carboxylic acid chloride in nitrobenzene at 90–100° C. for several hours.

Then ring closure was effected with 96 percent sulfuric acid at 95° C. during one hour. The dyestuff so obtained is converted into a nitronitramino-compound by stirring for several hours at 35–40° C. with nitric acid of 80 percent strength and the said compound is reduced with sodium sulfide solution while hot with simultaneous splitting off of the nitramino groups. The resulting product is dissolved in concentrated sulfuric acid for purification, separated as sulfate by addition of water and after customary working up, as described in the next paragraph above, subjected to benzoylation.

In a similar manner valuable dyestuffs are obtained when the benzoyl chloride used in paragraph 1 is replaced by the chloride of one of the carboxylic acids shown in column I of the following table.

sulfuric acid at 90° C. is reacted with 1-amino-4-nitro-anthraquinone-2-carboxylic acid chloride, in the resulting condensation product closure of the second oxazole ring effected and the nitro group reduced by vatting.

*Example 6*

33.5 parts of the compound of the formula (15)

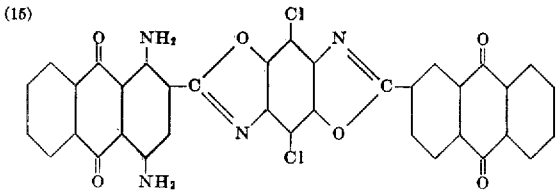

|   | I<br>Acid | II<br>Color of solution in H₂SO₄ | III<br>Vat | IV<br>Dyeing (Cotton) |
|---|---|---|---|---|
| 1 | p-Chlorobenzoic acid | Yellowish olive | Blue-violet | Blue-gray. |
| 2 | p-Cyanobenzoic acid | Brownish yellow | Blue | Do. |
| 3 | Pyridine-3-carboxylic acid | do | Blue-violet | Do. |
| 4 | Naphthalene-2-carboxylic acid | Yellow-brown | do | Greenish blue-gray. |
| 5 | Anthraquinone-2-carboxylic acid | Brownish yellow | Gray-violet | Do. |

*Example 5*

34.3 parts of the compound of the formula (13)

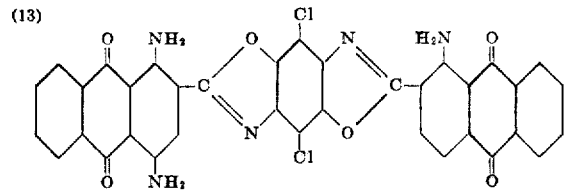

are heated in 1000 parts of nitrobenzene with 8.5 parts of benzoyl chloride and 5 parts of pyridine for 3 hours to 145–155° C. The resulting dyestuff of the formula (14)

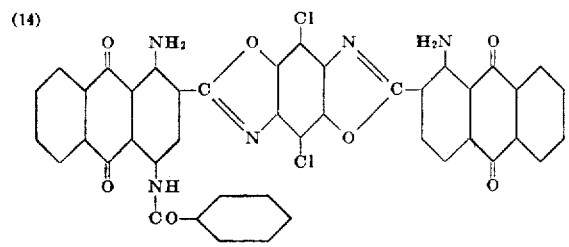

is filtered off at 70° C. It dissolves in concentrated sulfuric acid with an olive brown color and dyes cotton from a dark blue vat in bluish claret shades.

The starting material of the Formula 13 can be obtained by condensing the intermediate product of the Formula 11 (see Example 4) with 1-aminoanthraquinone-2-carboxylic acid chloride, closing the second oxazole ring with sulfuric acid (the resulting product dyes cotton from a dark blue vat in red shades), replacing the bromine atom present in 4-position of one of the anthraquinone nuclei by a p-toluene sulfonylamino group and hydrolyzing the latter. The compound of the Formula 13 produced in this manner dissolves in concentrated sulfuric acid with a yellow color. The individual reactions are advantageously carried out in the manner described in Example 4.

The same compound of Formula 13 can also be obtained when the intermediate product prepared by heating 1-aminoanthraquinone-2-aldehyde with 2:5-diamino-3:6-dichlorobenzoquinone, for several hours in concentrated sulfuric acid at 90° C. is reacted with 1-amino-4-nitro-anthraquinone-2-carboxylic acid chloride, in the resulting condensation product closure of the second oxazole ring effected and the nitro group reduced by vatting.

are suspended in 1200 parts of nitrobenzene, 8.5 parts of benzoyl chloride and 5 parts of pyridine added and the mixture stirred for 3 hours at 130–140° C. and 2 hours at 150–160° C. The dyestuff which is filtered off after cooling, dissolves in concentrated sulfuric acid with a yellowish olive color. It dyes cotton from a gray violet vat in gray shades.

The starting material can be prepared by reacting the intermediate product obtained according to Example 4, paragraphs 3, 4 and 5.

*Example 7*

10 parts of a 10% paste of the dyestuff of Formula 4 obtainable according to Example 1, are vatted at about 50° C. in 150 parts of water with the addition of 3 parts of sodium hydrosulfite and 6 parts by volume of 30% sodium hydroxide solution. To a dyebath of 2000 parts of water containing 4 parts by volume of 30% sodium hydroxide solution and 2 parts of sodium hydrosulfite, the resulting stock vat is added. 100 parts of cotton yarn are entered at 40° C. into the dyebath, after 15 minutes 20 parts of sodium chloride are added and dyeing is conducted for one hour at 40–50° C. Thereupon the cotton is squeezed out, oxidized, rinsed in cold water, acidified, rinsed again and finally soaped at the boil for ½ hour. It is dyed in fast blue gray shades.

*Example 8*

30 parts of the dyestuff of Formula 4 described in Example 1, 240 parts of water, 600 parts of potassium carbonate thickening, 30 parts of 30% sodium hydroxide solution and 20 parts of sodium formaldehyde sulfoxylate are mixed together, heated to 50° C. and then ground. After the addition of a further 80 parts of sodium formaldehyde sulfoxylate a paste is obtained which is ready for printing. Cotton or other vegetable fibers can be printed with this paste in the normal manner. After printing, the print is dried, steamed for 8 minutes, rinsed, oxidized with a solution containing per liter of water 3 grams of sodium perborate and 2 grams of 40 percent acetic acid for 5 minutes, rinsed, soaped at the boil, rinsed again and dried. In this manner very fast blue gray printings are obtained.

What is claimed is:
1. An anthraquinone vat dyestuff of the formula

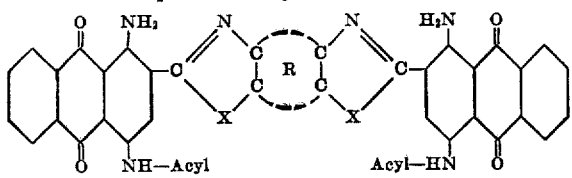

in which X is a member selected from the group consisting of an

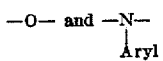

radical, R indicates an aromatic radical selected from the group consisting of phenyl, chlorophenyl and diphenyl radicals, and Acyl indicates the acyl radical of cyclic mono carboxylic acid.

2. The anthraquinone vat dyestuff of the formula

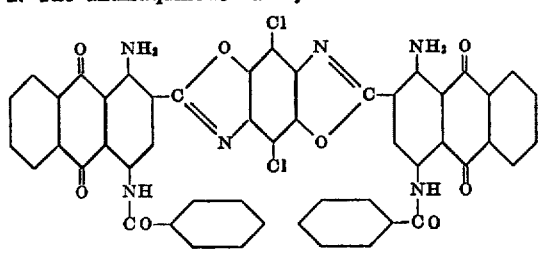

3. The anthraquinone vat dyestuff of the formula

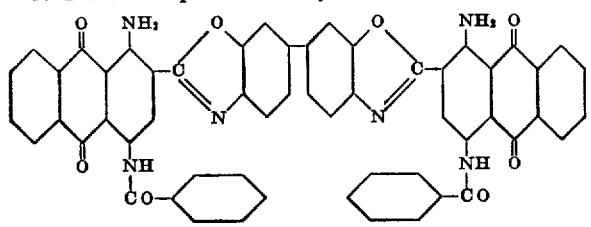

4. The anthraquinone vat dyestuff of the formula

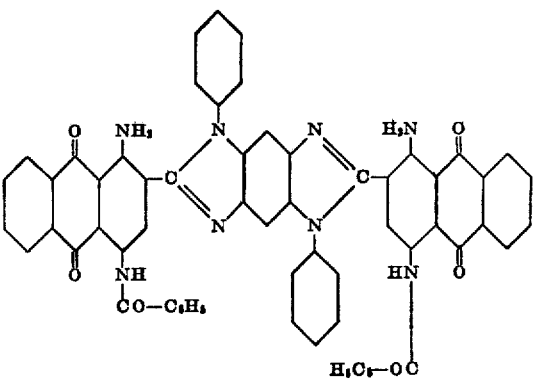

5. The anthraquinone dyestuff of the formula

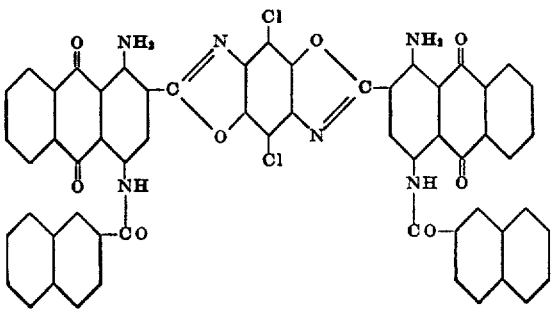

References Cited in the file of this patent
UNITED STATES PATENTS
2,453,410   Cullinan et al.  ---------- Nov. 9, 1948

UNITED STATES PATENT OFFICE

CERTIFICATE OF CORRECTION

Patent No. 2,807,622

September 24, 195

Theodor Holbro et al.

It is hereby certified that error appears in the printed specification of the above numbered patent requiring correction and that the said Letters Patent should read as corrected below.

Column 1, line 33, for "monocraboxy-" read -- monocarboxy- --; column 2, line 19, for "NHXacyl" read -- NH-acyl --.

Signed and sealed this 26th day of November 1957.

(SEAL)
Attest:
KARL H. AXLINE

Attesting Officer

ROBERT C. WATSON
Commissioner of Patents